United States Patent Office 2,901,461
Patented Aug. 25, 1959

2,901,461

CURABLE GLYCIDYL POLYETHER-POLYAMINE COMPOSITIONS

Victor Auerbach, North Plainfield, and Arthur K. Ingbermann, Middlebush, N.J., assignors to Union Carbide Corporation, a corporation of New York No Drawing. Application May 5, 1955
Serial No. 506,386

15 Claims. (Cl. 260—47)

This invention relates to improvements in the curing of polyepoxy compositions to hard, solid resinous products.

Polyepoxy compounds and mixtures having an epoxy equivalency greater than 1, i.e. containing an average of more than one 1,2-epoxy group

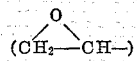

per molecule, can be cured by reaction with a wide variety of polyfunctional compounds to hard, insoluble, and infusible resinous products having many practical uses. For example, they may be reacted with polybasic acids or their anhydrides, polyhydric alcohols, polyphenols, polythiols, polyamides or polyamines. Catalytic amounts of such compounds as alkali metal hydroxides, tertiary amines, or Lewis acids such as aluminum chloride, boron trifluoride or boron trifluoride complexes, zinc chloride or stannic chloride have been proposed to accelerate the cure of polyepoxy compounds, but only the aliphatic alkylenepolyamines such as ethylene diamine, diethylene triamine and triethylene tetramine, exhibit a sufficient and controllable reactivity toward the oxirane ring to be generally useful for applications requiring initiation of cure at room temperature.

The aliphatic alkylene polyamines as a class, however, possess the following limitations.

(1) They are volatile, and their fumes are both noxious and disagreeable. Also, the curing is highly exothermic, and since the heat of reaction evolved by their use is faster than can readily be dissipated from the curing composition, the temperature of the mass rises rapidly. This causes unconsumed polyamine to bubble or even froth and thereby spoil the cured piece.

(2) They are subject to discoloration by air and light. At the high temperatures reached during cure, the discoloration is intensified and darkened pieces result.

(3) They tend to absorb carbon dioxide from the atmosphere.

(4) They are skin irritants, toxic penetrants and sensitizers. With susceptible individuals, direct contact may cause formation of pruritic rashes or skin cracking, and either direct contact or fumes may have a sensitizing effect which causes an allergic reaction in the form of skin reddening or swelling. This contact dermatitis problem is particularly severe in epoxy resin applications such as the preparation of tools, dies, jigs and fixtures for metal forming, enfilleting jobs such as auto body patching or "cold soldering," glass cloth or other lay-up type applications and the like in which direct contact by personnel with the epoxy resin-hardener composition is virtually unavoidable.

For these reasons the alkylene polyamines are rarely used per se, but rather in the form of epoxy resin adducts obtained by reacting excess polyamine with a glycidyl polyether in reactant ratios of about 4 moles:1 mole. The polyamine glycidyl polyether adducts so obtained are used as hardeners for epoxy resins.

The polyamine glycidyl polyether adducts are superior to the alkylene polyamines in that:

(1) The bubbling or frothing problem during curing is substantially eliminated;

(2) gel or curing speed is increased somewhat, yet (3) reaction control is improved because of the lower peak exotherm temperatures generally attained.

They in turn possess the following limitations, however:

(1) The color of the cured epoxy compound is substantially comparable to that afforded by the alkylene polyamines.

(2) They are also skin irritants, toxic penetrants and sensitizers.

(3) They are much more viscous than is technologically desirable.

(4) They are not water-soluble, hence not readily washed off equipment or one's person.

It has now been found that hydroxyalkyl alkylene polyamines containing at least one hydroxyalkyl group and at least three amino hydrogen atoms per molecule are individually or in admixture, effective hardeners for incorporation in polyepoxy compounds or compositions having an epoxy equivalent greater than one per average molecule to initiate curing of the polyepoxy compounds at room temperatures and, furthermore, said polyamines under normal conditions of use are not skin irritants.

Preferred hydroxyalkyl alkylene polyamines or alkanol alkylene polyamines, as regards curing properties, ease of application and substantial absence of skin irritating effects, are those represented by the following formula:

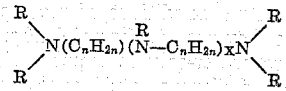

wherein X is an integer from zero to 3, $n$ is an integer from 2 to 6, R in each instance is a monovalent substituent being either hydrogen or a hydroxyalkyl group, as for example hydroxyethyl and hydroxypropyl, the hydroxyalkyl groups in any molecule not necessarily being all the same hydroxyalkyl group, and the number of instances per molecule where R represents a hydroxyalkyl group being at least one, but less than $X+2$.

Furthermore, mixtures of alkanol alkylene polyamines such as are obtained by reacting alkylene oxide with an alkylene polyamine, said mixtures having an average composition corresponding to the formula in the preceding paragraph, have been found to be effective hardeners for epoxy compounds and to be reasonably free from skin irritating effects providing the content of unreacted or excess alkylene polyamine in said mixture does not exceed about 10 percent by weight of the mixture.

Typical hydroxyalkyl alkylene polyamines useful in the practice of the present invention, and within the scope of the above structural formula are the following:

N-hydroxyethyl ethylene diamine $$NH_2CH_2CH_2NHCH_2CH_2OH$$

N-hydroxyethyl pentamethylene diamine $$NH_2(CH_2)_5NHCH_2CH_2OH$$

N-hydroxypropyl tetramethylene diamine $$NH_2(CH_2)_4NHC_3H_6OH$$

N-hydroxyethyl diethylene triamine $$NH_2C_2H_4NHC_2H_4NHC_2H_4OH$$

N,N-dihydroxyethyl diethylene triamine $$NH_2C_2H_4NHC_2H_4N(C_2H_4OH)_2$$

N,N″-dihydroxyethyl diethylene triamine $$NH(C_2H_4NHC_2H_4OH)_2$$

N-hydroxypropyl diethylene triamine $$NH_2C_2H_4NHC_2H_4NHC_3H_6OH$$

N,N-dihydroxypropyl diethylene triamine $$NH_2C_2H_4NHC_2H_4N(C_3H_6OH)_2$$

N,N''-dihydroxypropyl diethylene triamine $$NH(C_2H_4NHC_3H_6OH)_2$$

N-hydroxyethyl propylene diamine $$NH_2CH_2CH_2CH_2NHCH_2CH_2OH$$

N-hydroxypropyl propylene diamine $$NH_2C_3H_6NHC_3H_6OH$$

N-hydroxyethyl dipropylene triamine $$NH_2C_3H_6NHC_3H_6NHC_2H_4OH$$

N,N-dihydroxyethyl dipropylene triamine $$NH_2C_3H_6NHC_3H_6N(C_2H_4OH)_2$$

N,N'-dihydroxyethyl dipropylene triamine $$NH_2C_3H_6N\begin{matrix}C_2H_4OH\\ C_3H_6NHC_2H_4OH\end{matrix}$$

Tris-hydroxyethyl triethylene tetramine $$(HOC_2H_4)_2N(C_2H_4NH)_3C_2H_4OH$$

The hydroxyalkyl alkylene polyamines used in the practice of this invention are superior to previously known epoxy resin hardners possessing sufficient reactivity to be used in room temperature curing operations in the following respects:

(1) Under normal conditions of use they are not skin irritants, nor do they produce harmful aftereffects.

(2) They are water-soluble liquids of high fluidity, easy to handle and dispense and hence easily and safely removable from equipment and one's person.

(3) They are sufficiently non-volatile to be used directly, i.e., without prior adduct formation, and without giving rise to bubbles or froth during cure.

(4) They are clear, light colored—from colorless to amber, and much more color stable to air and light than the alkylene polyamines, even at the temperatures developed during cure. Epoxy resins cured with these polyamines have substantially the same color as the uncured epoxy resin.

(5) They are less prone to scavenge carbon dioxide from the atmosphere than the alkylene polyamines, and hence bubble formation during curing of the epoxy resins caused by release of the carbon dioxide is minimized.

(6) They effect a cure rate for glycidyl polyethers about as fast and generate about the same, and in some instances significantly lower, peak exotherm temperatures as do the prior art amine-epoxy adducts. They provide the same improvements as do the polyamine glycidyl polyether adducts with respect to cure speed and reaction control and in some instances provide a greater degree of the latter.

Inasmuch as only a few hydroxylalkyl alkylene polyamines are commercially available and then usually in such impure form as to contain undesirable amounts of skin irritating agents, reference is had to the following method for preparing suitable hydroxyalkyl alkylene polyamines having a sufficiently low content of alkylene polyamines or other substances as not to cause primary skin irritation to most individuals.

This method is based on the addition of an alkylene oxide to an alkylene polyamine as illustrated below with respect to ethylene oxide and diethylene triamine, e.g.

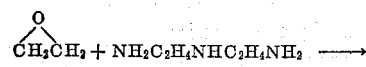

$$NH_2C_2H_4NHC_2H_4NHC_2H_4OH$$

The reaction can be conducted under pressure if desired and either in the absence of solvents or in the presence of water or an aliphatic monohydric alcohol at temperatures of from 50–55° C. to boiling. It has been found, however, that the reaction is more advantageously conducted at temperatures below about 40° C., and preferably from about 0° C. to 35° C. throughout, which effect improved yields of more readily purified products. Particularly, the low temperature reaction results in lesser amounts of unreacted alkylene polyamines than do the higher temperature procedures. This in many instances eliminates the need for stripping off residual unreacted alkylene polyamines, excessive amounts of which lead to skin irritation. For example, the probability of eventual irritation to individuals by diethylene triamine is three out of four. This probability is decreased to seven to eight individuals per 1,000, one per 1,000, and one per 10,000 as the diethylene triamine concentration is reduced to 10%, 5% and 1% respectively.

The benefits of conducting the polyamine-oxide reaction at lower temperatures will be better understood by reference to the subsequent examples. In Example 12, the reaction between 2 moles ethylene oxide and 1 mole diethylene triamine was conducted at or slightly below 30° C. for a total period of 9 hours. In Example 14, the same reaction was carried out with a 1.33% excess of ethylene oxide at 50–55° C. over a total period of 15.25 hours. Yet despite the longer reaction period and the excess oxide which tends to yield lower unreacted amine contents (compare Examples 7 and 9), the product of Example 14 contained more unreacted diethylene triamine (8.5%) than the product of Example 12 (3.4%).

As indicated above, the free alkylene polyamine content of the reaction products may be reduced further, i.e., the yield of desired end products increased, by using an excess of oxide as illustrated by comparing Examples 7 and 9.

Conversely, if the primary objective is the preparation of pure compounds such as N-hydroxyethyl diethylene triamine or N-hydroxypropyl diethylene triamine and the like, much greater yields are obtained by using excess amine as illustrated by Examples 15 and 16.

Examples 1–19 illustrate the preparation of hydroxyalkyl polyamine compounds and mixtures of such polyamines particularly suitable as hardness for epoxy resins containing an average of more than one oxirane group per molecule. In these examples, except where otherwise indicated, all parts and percentages are by weight; refractive index, sodium D line at 25° C., measured with Abbe refractometer; and viscosities, specific gravities and other properties were measured at 25° C. Furthermore, all the described hydroxyalkyl polyamine products, including pure compounds, simple mixtures, complex mixtures, reaction crudes, distillation fractions and residues were found readily soluble in water and alcohol.

EXAMPLE 1

*N-hydroxyethyl ethylene diamine*

Commercial hydroxyethyl ethylene diamine was fractionally distilled at 10 mm. and the fraction which came over at 126° C. (vapor temperature) was retained. This purified sample had a refractive index (20° C.) of 1.4863 and boiling point (capillary tube method) of 244° C. at 760 mm.

EXAMPLE 2

*Hydroxyethyl propylene diamine*

Commercial hydroxyethyl propylene diamine was fractionally distilled at 10 mm. and the fraction which came over at 131° C. (vapor temperature) was retained. This purified sample had a refractive index (20° C.) of 1.4771 and boiling point (capillary tube method) of 240° C. at 760 mm.

EXAMPLE 3

N-hydroxypropyl propylene diamine 371 g. (5 moles) propylene diamine and an equal weight of water were mixed in a 2-liter flask immersed in a cooling bath; the solution was cooled to 22° C. and 290 g. (5 moles) propylene oxide was added from a dropping funnel, with vigorous agitation, over a one hour period, the addition rate being adjusted as needed to keep the reaction mass temperature from rising above 30° C. The flask was set aside at room temperature overnight; then the solution was dehydrated at 85° C. (liquid temperature) and 25 mm. in a circulating flash evaporator and the crude, dry reaction product fractionally distilled under vacuum. There was so obtained a 48% yield (316 g.) of N-hydroxypropyl propylene diamine which came over at 110° C. at 6–7 mm. This product was a clear, colorless, mobile liquid having a refractive index of 1.4655, a viscosity of 125 cps., a specific gravity of 0.959 and a neutralization equivalent of 66.8 (calculated neutralization equivalent=66).

EXAMPLE 4

Dihydroxyethyl dipropylene triamine 655 g. (5 moles) dipropylene triamine and an equal weight of water were mixed in a 2-liter flask immersed in a cooling bath; the solution was cooled to 25° C. and ethylene oxide was passed in through a sparger, with vigorous agitation, until 440 g. (10 moles) was absorbed. The ethylene oxide addition rate was adjusted as needed to keep the reaction mass temperature from exceeding 30° C. This addition took four hours. The reaction mass was then agitated for one hour at room temperature, then vacuum dehydrated by passing it through a circulating flash evaporator at 85° C. (liquid temperature) at 25 mm. pressure, and then distilling off the remaining water at 50 mm. pressure to a pot temperature of 200° C. The residue product was a clear, pale amber, mobile liquid having a refractive index of 1.5027 and a neutralization equivalent of 73.6. It was a mixture whose average composition corresponded to that of dihydroxyethyl dipropylene triamine (calculated neutralization equivalent=73). Analysis showed that it was largely dihydroxyethyl dipropylene triamine together with small amounts of unreacted dipropylene triamine (1.6%), hydroxyethyl dipropylene triamine (8.6%) and corresponding amounts of more highly substituted homologues.

EXAMPLE 5

Dihydroxyethyl dipropylene triamine

A product prepared according to the method of Example 4 was fractionally distilled at 7 mm. pressure and the following fractions were collected:

|  | B.P. at 7 mm., ° C. |
|---|---|
| Frac. A | 65 |
| Frac. B | 120–122 |
| Frac. C | 170–175 |

Fraction A was not identified. Fraction B was a clear, colorless liquid with a neutralization equivalent of 53. Fraction C was a clear, pale amber liquid having a refractive index of 1.4950, specific gravity of 1.015, viscosity of 235 cps., neutralization equivalent of 74.5 and tertiary amine equivalent of 215.4.

Since N,N-dihydroxyethylene dipropylene triamine and N,N'-dihydroxyethyl dipropylene triamine and any binary mixture of these two isomers have the same theoretical neutralization equivalents, 73, and tertiary amine equivalents 219, the excellent agreement between these values and those observed for fraction C indicates that fraction C contains no significant amounts of any components other than these two isomers.

EXAMPLE 6

N-hydroxypropyl diethylene triamine, and bis-hydroxypropyl diethylene triamine 412 g. (4 moles) diethylene triamine and 412 g. water were mixed in a 2-liter flask immersed in a cooling bath; the solution was cooled to 20° C. and 232 g. (4 moles) propylene oxide was added from a dropping funnel, with vigorous agitation, over a three hour period, the addition rate being adjusted as needed to keep the reaction mass temperature from exceeding 25° C. The reaction mass was then stirred one hour at room temperature and vacuum dehydrated as in Example 4. The 624 g. (97% yield) of crude, dehydrated reaction product was then fractionally distilled at 5 mm. pressure and the following fractions collected.

Fraction A, which had a boiling point of 146–148° C. at 5 mm., was a clear, colorless liquid having a viscosity of 285 centipoises; specific gravity of 1.005; refractive index of 1.4885 and neutralization equivalent of 56. It was identified as N-hydroxypropyl diethylene triamine having a neutralization equivalent of 54. It was obtained in 33% yield (207 g.)

Fraction B, having a boiling point of 200–205° C. at 5 mm., a viscosity of 4000 cps., specific gravity of 1.026, refractive index of 1.4887, neutralization equivalent of 73 and tertiary amine equivalent of 282, was obtained in 27% yield (171 g.)

As to the identity of fraction B, there are three possible isomeric bis-hydroxypropyl diethylene triamines, the N,N-, the N,N'- and the N,N''-derivatives. All three have the same calculated neutralization equivalent of 73; but their tertiary amine equivalents differ. The N,N- and N,N'- are 219, while that of the N,N''- is infinite, i.e., no 3° amine group present. Fraction B therefore appears to be an all-(bis-hydroxypropyl diethylene triamine) mixture consisting of about 22% N,N''-isomer and 78% of the other two isomers in undefined proportions.

EXAMPLE 7

Bis-hydroxypropyl diethylene triamine 515 g. (5 moles) diethylene triamine and 515 g. water were mixed in a 3-liter flask immersed in a cooling bath, the solution cooled to 15° C. and a mixture consisting of 580 g. (10 moles) propylene oxide and 580 g. water was added from a dropping funnel over a 1.5 hour period, with vigorous agitation, at such a rate that the reaction mass temperature did not exceed 30° C. The reaction mass was then stirred an additional hour at room temperature, then set aside for 24 hours at room temperature, and then vacuum dehydrated as in Example 4. The crude bis-hydroxypropyl diethylene triamine so obtained was a pale yellow liquid having a refractive index of 1.4880 and neutralization equivalent of 72.4 (calc. 73). It contained 2.2% unreacted diethylene triamine.

EXAMPLE 8

A portion of the product from Example 7 was freed of the 2.2% unreacted diethylene triamine it contained by vacuum distilling off that amine at 4 mm. pressure. The residual bis-hydroxypropyl diethylene triamine which now contained no components boiling below 175° C. at 4 mm. had a refractive index of 1.4884 and neutralization equivalent of 72.1 (calc. 73).

EXAMPLE 9

Mixture of mono- and polyhydroxypropyl diethylene triamines 309 g. (3 moles) diethylene triamine and 309 g. water were reacted with 392 g. (6.75 moles) propylene oxide according to the procedure of Example 7. The crude, dry bis-hydroxypropyl diethylene triamine so obtained contained only 0.4% unreacted diethylene triamine and an average of 2.25 hydroxypropyl groups per molecule.

EXAMPLE 10

*Hydroxyalkyl polyamine mixture obtained by reacting diethylene triamine and ethylene oxide in equimolar amounts*

515 g. (5 moles) diethylene triamine and 515 g. of water were mixed in a 2-liter flask immersed in a cooling bath, the solution was cooled to 17° C. and ethylene oxide was passed in through a sparger, with vigorous agitation, until 220 g. (5 moles) was absorbed. The addition, which required 3.5 hours, was performed at such a rate that the reaction mass temperature did not rise above 25° C. The reaction mass was then agitated one hour at room temperature and vacuum dehydrated as in Example 4. The unreacted diethylene triamine (20%) and other low boiling components present (0.8%) were then removed by fractionally distilling them off at 5 mm. pressure (to a vapor temperature of 165° C.). The residue product so obtained had a refractive index of 1.5021 and neutralization equivalent of 57.2.

EXAMPLE 11

*N-hydroxyethyl diethylene triamine and bis-hydroxyethyl diethylene triamines*

A product prepared according to the method of Example 10 was fractionally distilled at 5 mm. pressure and the following fractions collected:

Fraction A, N-hydroxyethyl diethylene triamine (39% yield): B.P. 165° C. at 5 mm.; clear, colorless liquid of refractive index 1.4989; specific gravity 1.037; viscosity 280 centipoises; neutralization equivalent 49.7 (calc. 49.0) and contained no tertiary amino groups as determined by perchloric acid titration of a completely acetylated sample.

Fraction B was a mixture of bis-hydroxyethyl diethylene triamines (10.5% yield): B.P. 200–225° C. at 5 mm.; refractive index 1.5037; neutralization equivalent 65 (calc. 63.7) and tertiary amine equivalent 230.

EXAMPLE 12

*Bis-hydroxyethyl diethylene triamine*

1545 g. (15 moles) diethylene triamine and an equal weight of water were mixed in a 5-liter flask immersed in a cooling bath; the solution was cooled to 25° C.; and ethylene oxide was passed in through a sparger, with vigorous agitation, until 1320 g. (30 moles) was absorbed. The ethylene oxide addition rate was adjusted as necessary to keep the reaction mass temperature from rising above 30° C. This addition required about eight hours. When addition was completed, the flask was removed from the cooling bath and the solution stirred an additional hour at room temperature. At this point the solution had a refractive index of 1.4535 and a neutralization equivalent of 98. The reaction mass was then dehydrated by vacuum distilling off the water at 47 mm. pressure to a pot temperature of about 200° C., the product cooled, weighed and discharged.

The product (2806 g., corresponding to 98% yield) was an almost colorless liquid having the following properties: specific gravity 1.04; viscosity 2900 centistokes; miscible with water or alcohols; refractive index of 1.506; and neutralization equivalent 66.

While the product had an average composition corresponding to that of dihydroxyethyl diethylene triamine, by analysis it contained 3.4% unreacted diethylene triamine, 21% N-hydroxyethyl diethylene triamine and a high boiling remainder as described in subsequent Example 13.

EXAMPLE 12A

*Mixture containing bis-hydroxyethyl diethylene triamine*

A portion of the product of Example 12 was freed of unreacted diethylene triamine by fractionally distilling at 5 mm. pressure to a vapor temperature of 145° C. The residue product so obtained had a refractive index of 1.5055 and neutralization equivalent of 67.4.

EXAMPLE 13

774 g. of the product of Example 12 was fractionally distilled at 5 mm. pressure. The first cut, 26 g., which came over at a vapor temperature of 85–95° C. was identified as unreacted diethylene triamine, and the second cut, 162 g., which came over at 165–175° C. was identified as N-hydroxyethyl diethylene triamine. The remainder, 568 g., having a boiling point in excess of 175° C. at 5 mm., had a refractive index of 1.5069, a neutralization equivalent of 74.3 and a tertiary amine equivalent of 174. Calculations based on material balance of diethylene triamine and ethylene oxide indicate this last product has an average molecular weight of 217 and contains an average of 2.6 hydroxyethyl groups per molecule. Its calculated neutralization equivalent is therefore 72.3, in good agreement with the observed value of 74.3. It is therefore essentially a 40:60 mixture of various bis- and tris-hydroxyethyl diethylene triamines.

The observed tertiary amine equivalent indicates that about 80% of the overall mixture consists of N,N- and/or N,N'-substituted derivatives and about 20% is N,N''-bis-hydroxyethyl diethylene triamine.

EXAMPLE 14

3090 g. (30 moles) diethylene triamine and 60 g. water were charged to a 2-gallon stainless steel autoclave and 2680 g. (60.8 moles) ethylene oxide passed in, with vigorous agitation, over a 13.25 hour period at such a rate that the reaction mass temperature was 50–55° C. throughout and pressure was kept below a gage pressure of 5 p.s.i. The reaction mass was then stirred for an additional two hours at 50–55° C. and then vacuum dehydrated by fractionally distilling off the water at 1 mm. pressure. The crude, dry reaction product so obtained was a pale yellow liquid containing 8.5% unreacted diethylene triamine as determined by fractionally distilling an aliquot according to the procedure of Example 13 and directly identifying the diethylene triamine fraction.

EXAMPLE 15

*N-hydroxyethyl diethylene triamine*

515 g. (5 moles) diethylene triamine and 515 g. water were mixed; the solution cooled to 25° C. and 44 g. (1 mole) ethylene oxide passed in with vigorous agitation over a half hour period at such a rate that the reaction mass temperature remained below 30° C. The reaction mass was agitated for one hour at room temperature and then vacuum dehydrated substantially according to the procedure of Example 10. The dry reaction crude was then fractionally distilled at a vapor temperature of 155–165° C. and at 4 mm. pressure. There was obtained 106 g. (72% yield calculated on ethylene oxide) of N-hydroxyethyl diethylene triamine (refractive index 1.4985).

EXAMPLE 16

4120 g. (40 moles) diethylene triamine and 4120 g. water were mixed; the solution was cooled to 25° C. and then 464 g. (8 moles) propylene oxide was added from a dropping funnel, with vigorous agitation, over a 1.25 hour period at such a rate that the reaction mass temperature remained below 30° C. The reaction mass was agitated for one hour at room temperature and then vacuum dehydrated, substantially according to the procedure of Example 6. The unreacted (excess) diethylene triamine was removed by fractionally distilling it off at 50 mm. to a vapor temperature of 120° C., and the dry diethylene triamine-free residue was then fractionally distilled at 4–6 mm. pressure. There was obtained 1138 g. (88.4% yield, based on propylene oxide) of N-hydroxypropyl diethylene triamine (boiling point 146–151° C. at 4–6 mm.)

EXAMPLES 17, 18 AND 19

Technical grade triethylene tetramine, a mixture of isomeric triethylene tetramines such as $NC_2(C_2H_4NH)_3H$ and $N(C_2H_4NH_2)_3$ was reacted with respectively, three moles ethylene oxide, two moles ethylene oxide and two moles propylene oxide per mol of triethylene tetramine and freed of triethylene tetramine by fractional distillation under vacuum according to the procedures described below.

|  | Example 17 | Example 18 | Example 19 |
|---|---|---|---|
| I. Reactants: |  |  |  |
| Triethylene tetramine, g | 439 | 486 | 490 |
| Water, g | 439 | 486 | 490 |
| Ethylene oxide, g | 396 | 293 | 0 |
| Propylene oxide, g | 0 | 0 | 390 |
| II. Reaction Conditions: |  |  |  |
| Maximum Temp. (° C.) | 30 | 30 | 30 |
| Oxide addition period, hrs | 5 | 2.25 | 1.5 |
| III. Reaction Crude after Vac. Dehydration: |  |  |  |
| Yield, g | 745 | 816 |  |
| Refractive index (25° C.) | 1.5179 | 1.5107 | 1.4952 |
| Neutr. Equiv | 78.9 | 58.1 | 71.1 |
| 3° amine equiv | 159.5 |  |  |
| IV. Unreacted triethylene tetramine removed from iii; g | 57 | 59 | 75 |
| V. Triethylene tetramine-free Residue: |  |  |  |
| Yield, g | 688 | 757 |  |
| Refr. index | 1.5141 | 1.5108 | 1.4948 |
| Neutr. equiv | 76.4 | 61.6 | 77.2 |

The residue (v) of Example 17 is a mixture of mono- and polyhydroxyethyl triethylene tetramines containing an average of about 3.4 hydroxyethyl groups per molecule, as calculated from material balance data. Its observed neutralization equivalent, 76.4, agrees well with that calculated, 74, for such a mixture.

The dehydrated or dry crude of Example 18 (iii) is a mixture of mono- and polyhydroxyethyl triethylene tetramines having an average composition corresponding to that of a dihydroxyethyl triethylene tetramine (calculated neutralization equivalent=58.5).

The residue of Example 18 (v) is a mixture of mono- and polyhydroxyethyl triethylene tetramines containing an average of about 2.3 hydroxyethyl groups per molecule, calculated from material balance. The agreement between the observed neutralization equivalent 61.6, and that calculated for such a mixture, 62, is confirmatory evidence.

The residue of Example 19 (v) is a mixture of mono- and polyhydroxypropyl triethylene tetramines containing an average of about 2.4 hydroxypropyl groups per molecule. Its calculated neutralization equivalent is 71.

The neutralization equivalent reported in the preceding examples is the number of grams of the compound (or mixture) containing one gram-equivalent of amino nitrogen, (primary, secondary or tertiary). The neutralization equivalent is therefore equal to the molecular weight (or average molecular weight) of the compound (or mixture) divided by the total number (or average number) of $-NH_2 + >NH + >N-$ groups per molecule. It is determined by titration in glacial acetic acid with perchloric acid to methyl violet endpoint; and calculated as follows:

Neutralization equivalent =

$$\frac{\text{sample weight}}{\text{(ml. acid used)(normality of acid)}}$$

where normality is determined by standardization against pure sodium carbonate using methyl violet indicator.

The tertiary amine equivalent reported in the preceding examples is the number of grams of compound (or mixture) containing one gram-equivalent of tertiary amine and is therefore equal to the molecular weight (or average molecular weight) divided by the number (or average number) of 3° amino groups per molecule. It is measured by completely acetylating the test sample with acetic anhydride, which converts the primary and secondary amino groups present to non-titratible N-substituted amido structures, but does not alter the tertiary amino groups, then titrating with perchloric acid in glacial acetic acid.

$$\text{Tertiary amine eq.} = \frac{\text{sample weight}}{\text{(ml. acid)(normalty of acid)}}$$

The hydroxyalkyl substituted polyamines herein described are particularly effective as hardeners for the glycidyl polyethers of dihydric phenols having an epoxy equivalency between 1.0 and 2.0. These glycidyl polyethers are usually prepared by reacting preferably an excess of epichlorohydrin with a dihydric phenol in an alkaline medium such as sodium hydroxide. Among the simplest polyglycidyl polyethers are the diglycidyl ethers of dihydric mononuclear phenols such as resorcinol, however, most commercial epoxide resins today are the epoxy derivatives of the dihydric bisphenols such as the dihydroxydiphenyl alkanes and particularly 2,2-bis(4-hydroxyphenyl) propane which is frequently referred to by the trade as "bisphenol A."

Reference is had to the Bender et al. U.S. Patent No. 2,506,486 for a more complete description of the preparation of diglycidyl ethers of bisphenols. Inasmuch as the resinous diglycidyl ethers of "bisphenol A" have such wide spread usage, the hardening action of the hydroxyalkyl substituted polyamines can be conveniently illustrated with respect thereto in comparison with conventional hardeners, although it is to be understood that other polyepoxy compositions such as the polyepoxy aromatic amines or polyamines as for example diglycidyl aniline or tetraglycidyl phenylene diamine and polyglycidyl thioethers of polythiols such as are described in copending application Serial No. 352,024, filed April 29, 1953, by Bender et al., now U.S. Patent No. 2,731,437 can be hardened or cured in a satisfactory manner with the hydroxyalkyl alkylene polyamines herein described and contemplated. Other suitable epoxy resins for hardening by the hydroxyalkyl alkylene polyamines include those made by epoxidizing dihydroxy diphenyl alkanes such as "bisphenol A" or diphenol reaction products of phenol and formaldehyde, or phenol-formaldehyde novolacs, or polyhydric aliphatic compounds such as glycerine, glycols, and the like, providing they contain more than one epoxide group per molecule.

Accordingly, there was used for purposes of comparison, a resinous diglycidyl ether prepared by reacting epichlorohydrin with 2,2-bis(4-hydroxyphenyl) propane in the presence of sodium hydroxide as catalyst and ethyl alcohol as solvent according to the procedure described in the Bender et al. U.S. Patent No. 2,506,486. The resin so obtained had a specific gravity of 1.16 (at 25° C.), a viscosity (25° C.) of 15,000 cps. and an epoxy equivalent[1] of 190. For convenient reference, this resin will herein after be identified as "Epoxy Resin A."

To compare the hardening properties of the hydroxyalkyl alkylene polyamines with a conventional, substantially non-volatile adduct type hardener, such a hardener was prepared as follows:

*Adduct of diethylene triamine and diglycidyl ether of Bisphenol-A*

475 g. (1.25 moles) of "Epoxy Resin A" was added slowly and with vigorous agitation to 515 g. (5 moles) of diethylene triamine. The addition rate was adjusted and cooling applied as needed to keep the reaction mass below 75° C. The product had a viscosity of 9,000 cps. (25° C.), specific gravity of 1.07 (25° C.) and amine equivalency of 49.2.[2]

---
[1] Epoxy equivalent is the number of grams resin containing one gram mole epoxide group. It is measured by reacting with pyridine hydrochloride, then back-titrating the unconsumed HCl with alcoholic KOH.

[2] Perchloric acid titre calculated as percent by weight diethylene triamine present.

In subsequent Tables Ia and Ib the hardening action of this adduct hardener is the subject matter of Example 20 and Example 21 and the remaining examples in these two tables, Examples 22 to 31 illustrate the hardening action of various hydroxyalkyl alkylene polyamines and mixtures of such polyamines.

In subsequent Table II the hardening action of a conventional volatile simple polyamine, namely diethylene triamine is compared with that obtained by representative hydroxyalkyl alkylene polyamines.

immobile, substantially hard state was recorded as the gel time (or pot life). The maximum temperature registered by the thermocouple on a recording potentiometer was noted as the peak exotherm; it generally, but not invariably, occurred about 0.5–1.5 minutes after gel. The transition from the fluid, mobile condition to an immobile, substantially hard mass (gelation) occurs abruptly and sharply within an interval of only a few seconds, and is therefore easily distinguished.

The mechanical properties were obtained as follows.

TABLE Ia

| Example | 20 | 21 | 22 | 23 | 24 | 25 |
|---|---|---|---|---|---|---|
| Hardener of Example | Adduct Type | Adduct Type | 2 | 4 | 6 (Frac. A) | 7 |
| Parts hardener used: | | | | | | |
| g./equiv. wt. of Epoxy Resin A | 47.5 | 64 | 57 | 73 | 41 | 73 |
| equivalents/equiv. wt. of Epoxy Resin A | 1.0 | 1.30 | 1.45 | 1.0 | 1.0 | 1.0 |
| Pot. Life (Min.) | 24 | 18 | 24 | 24 | 27 | 29 |
| Peak Exotherm (° C.) | 195 | 195 | 210 | 180 | 215 | 178 |
| Heat Distortion (° C.) | 103 | 92 | 64 | 53 | 94 | 68 |
| Izod Impact (ft. lbs./in. width) | 0.20 | 0.20 | 0.22 | 0.22 | 0.19 | 0.21 |
| Rockwell Hardness (M scale) | 101 | 97 | 89 | 72 | 93 | 86 |
| Compressive Yield Strength (p.s.i.) | 16,000 | 15,500 | 14,000 | 12,500 | 14,500 | 13,500 |
| Ultimate Compressive Strength (p.s.i.) | 36,000 | 36,000 | 14,000 | 49,000 | 38,500 | 41,500 |
| Ultimate Flexural Strength (p.s.i.) | 14,000 | 14,500 | 6,000 | 14,000 | 16,500 | 16,500 |
| Flexural Modulus of Elasticity (p.s.i.) | 470,000 | 450,000 | 540,000 | 430,000 | 410,000 | 525,000 |

TABLE Ib

| Example | 26 | 27 | 28 | 29 | 30 | 31 |
|---|---|---|---|---|---|---|
| Hardener of Example | 9 | 11 (Frac. A) | 11 (Frac. A) | 12 | 13 (residue) | 18 (dry crude) |
| Parts hardener used: | | | | | | |
| g./equiv. wt. of Epoxy Resin A | 77 | 37 | 50 | 65 | 73 | 59 |
| equivalents/equiv. wt. of Epoxy Resin A | 0.9 | 1.0 | 1.35 | 1.0 | 0.8 | 1.0 |
| Pot. Life (Min.) | 34 | 23 | 13 | 19 | 54 | 24 |
| Peak Exotherm (° C.) | 133 | 225 | 225 | 195 | 120 | 172 |
| Heat Distortion (° C.) | 56 | 92 | 78 | 64 | 57 | 76 |
| Izod Impact (ft. lbs./in. width) | 0.21 | 0.19 | 0.19 | 0.20 | 0.20 | 0.19 |
| Rockwell Hardness (M scale) | 88 | 93 | 84 | 85 | 73 | 92 |
| Compressive Yield Strength (p.s.i.) | 15,000 | 14,000 | 13,000 | 12,000 | 12,000 | 13,000 |
| Ultimate Compressive Strength (p.s.i.) | 47,000 | 39,000 | 40,500 | 38,000 | 38,500 | 41,500 |
| Ultimate Flexural Strength (p.s.i.) | 15,000 | 15,000 | 15,500 | 15,000 | 14,000 | 15,500 |
| Flexural Modulus of Elasticity (p.s.i.) | 550,000 | 400,000 | 500,000 | 475,000 | 475,000 | 400,000 |

TABLE II

| Hardener | Gms. Hardener/Eq. Wt. of Epoxy Resin A [1] | Gel Time (min.) | Temp. at Gel Point (° C) | Peak Exotherm Temp. (° C) | Time to Reach Exotherm (min.) |
|---|---|---|---|---|---|
| Diethylene Triamine | 21 | 34 | 100 | 200+ | 35 |
| Example 2 | 39 | 45 | 160 | 175 | 46 |
| Example 3 | 44 | 69 | 155 | 170 | 70 |
| Example 5, Frac. C | 73 | 14 | 178 | 180 | 14 |
| Example 6, Frac. A | 40 | 29 | 160 | 189 | 29 |
| Example 6, Frac. B | 73 | 37 | 199 | 199 | 37 |
| Example 11, Frac. A | 37 | 22 | 145 | 200+ | 23 |
| Example 17, Residue | 116 | 36 | 94 | 128 | 39 |
| Example 19, Residue | 79 | 41 | 78 | 128 | 44 |

[1] Corresponds in each instance to equivalent weights of hardeners and epoxy resin.

The gel time or pot life and peak exotherm temperatures were determined in the following manner: 50 g. of Epoxy Resin A and the appropriate weight of hardener were mixed together at room temperature for two minutes. 50 g. of this mixture was poured into a 4 ounce paper cup; cup and contents were placed in a constant temperature box at 25° C. and an iron-constantin thermocouple positioned exactly in the center of the curing mass. The time elapsed between the initial addition of the hardener to the epoxy resin and attainment of an Bar castings 0.25" x 1.25" x 8" were prepared by allowing the indicated resin-hardener composition to gel under room temperature curing conditions and then aftercured for two hours at 120° C. Test pieces were then machined from these castings and tested as prescribed by ASTM procedures.

The ASTM procedure numbers are listed below, together with two reference levels for each property. It should be borne in mind that the so-called "exacting" applications of epoxy resins usually place a premium on one or more particular properties—not on all properties simultaneously. Consequently, a hardener which leads to cured compositions displaying a high degree of even one property and acceptable degrees of the other properties may well be particularly advantageous for certain applications.

| Property | ASTM Proc. No. | Minimum Acceptable Values | |
|---|---|---|---|
| | | Gen'l Purpose Applications | Exacting Applications |
| (1) Heat Distortion | D-648-45T | 50° C | 75-125° C. |
| (2) Izod Impact | D-256-47T | 0.15 ft. lbs./in. width | 0.20 ft. lbs./in. width. |
| (3) Rockwell Hardness | D-785-51 | 60 (M scale) | 80 (M scale). |
| (4) Compressive Yield Strength | D-695-52T | 12,000 p.s.i. | 12,000 p.s.i. |
| (5) Ultimate Compressive Strength | D-695-52T | 25,000 p.s.i. | 25,000 p.s.i. |
| (6) Ultimate Flexural Strength | D-790-49T | 12,000 p.s.i. | 12,000 p.s.i. |
| (7) Flexural Modulus of Elasticity | D-790-49T | 400,000 p.s.i. | 400,000 p.s.i. |

Generally, compressive yield (4) is a more useful index than ultimate compressive (5) and flexural modulus (7) more useful than ultimate flexural (6) since they (4 and 7) indicate resistance to deformation or dimensional stability under stress. Moderately low values of (5) and (6) are therefore tolerated for many applications providing (4) and (7) are acceptable.

In comparing hardeners and cured resin-hardener compositions, the stoichiometry of the hardener-epoxy resin reaction must be considered and comparison should be made not at equal weights of hardener per unit weight epoxy resin but rather at equivalent weights of hardener per epoxide group present. In this respect, an equivalent weight of hardener is that weight which provides one gram atom of amino hydrogen, or the molecular weight (or average molecular weight) divided by the number (or average number) of amino hydrogens per molecule. For adduct type hardeners such as the adduct of diethylene triamine and the diglycidyl ether of bisphenol-A, the "epoxide" content of the adduct must be taken into account also; and the equivalent weight is that amount which provides an equal number of epoxide groups and amino hydrogen atoms in the overall resin-hardener mixture. The use of non-stoichiometric resin-hardener ratios will have, in general, the following effects:

(i) The pot life (or gel time) will be increased or decreased, respectively, by decreasing or increasing the hardener to resin ratio.

(ii) Heat distortion and hardness will be decreased by either more or less than stoichiometric amounts of hardener, with too little hardener being more damaging, as a rule, than too much hardener.

(iii) Strength properties, e.g., compressive, flexural and impact, will not be altered significantly by deviating, within reasonable limits, from stoichiometric resin-hardener proportions.

It can be seen from Tables Ia, Ib and II that the hardener-resin compositions of this invention are substantially comparable to those of the prior art in the following respect:

(i) Cure speed (gel time or pot life);
(ii) Reaction controllability (peak exotherm);
(iii) Latitude (effect of concentration on properties); and
(iv) Strength properties (impact, compressive, flexural).

While heat distortion and hardness are not as high as those conferred by the amine-epoxy adduct type, they nevertheless are above the minima required for applications generally employing hardeners of this sort.

The hydroxyalkyl-alkylene-polyamines provide the following improvements:

The alkylene polyamines and their epoxy adducts fume in air and have strong, objectionable odors, whereas the hydroxyalkyl-alkylene polyamines are substantially non-fuming and have relatively mild odors.

The hydroxyalkyl-alkylene polyamines as a class are considerably less volatile than the alkylene polyamines which permits their use directly, i.e., without prior adduct formation, as per the examples in Tables Ia and Ib and further reduces odor problems. The diethylene triamine hardened composition cited in Table II contained numerous small bubbles, because of the volatility of the polyamine at the temperatures reached during gelation and cure. This undesirable effect was not observed with any of the other compositions listed in Tables Ia, Ib and II.

The hydroxyalkyl-alkylene polyamines as a class are less viscous than the epoxy-alkylene polyamine adduct type hardeners. This is a very considerable advantage since it permits better mixing, which gives improved homogeneity and product uniformity, and provides a more fluid resin-hardener composition which gives improved flow and fill-out in intricate contours and around inserts or elements being encapsulated, makes for easier and more complete removal of air bubbles entrapped during mixing and pouring, penetrates the reinforcing matrix (e.g., glass cloth, chopped strands, mats, etc.) which are frequently used in combination with such resinous compositions more quickly, more completely and more uniformly, permits higher filler contents and generally facilitates handling and use.

In general, better wetting of fillers and metal surfaces are obtained resulting in bond strengths by the cured compositions as much as 50 to 100% stronger than heretofore obtained with conventional hardeners.

The hydroxyalkyl-alkylene polyamines are all water soluble and this property, in combination with their low viscosity, permits rapid, safe and economical cleaning of equipment and personnel. Moreover, they have somewhat better color and heat stability, i.e., they do not darken as much (if at all) during storage and epoxy compositions hardened therewith also display superior color retention.

The alkylene polyamines and their epoxy resin adducts are, as a group, primary skin irritants, i.e., major residual injury may result in spite of prompt treatment due to skin irritation and/or skin penetration.

The hydroxyalkyl and polyhydroxyalkyl-alkylene polyamines of this invention are far superior in these respects. That is, in practically all instances contact of alkanol polyamines with skin surfaces produces little or no residual injury, particularly if they are promptly washed off the skin.

While the use as hardeners for epoxy resins of only pure hydroxyalkyl alkylene polyamines or mixtures thereof derivable from the reaction of a single alkylene polyamine with a single alkylene oxide (per Examples 1–16) or mixtures of isomeric alkylene polyamines with a single oxide (per Examples 17–19) are illustrated in Examples 22–31 and in Table II nevertheless there can be used mixtures and even pure compounds derivable from the stepwise reaction of an alkylene polyamine first with one alkylene oxide and then with another. For example, (a) diethylene triamine can be reacted with ethylene oxide to yield hydroxyethyl diethylene triamine which can then be reacted with propylene oxide to yield a hydroxyethyl hydroxypropyl diethylene triamine. Also useful as hardeners are the hydroxyalkyl alkylene polyamines prepared by (b) the direct reaction of a polyamine with mixed oxides, or by (c) the reaction of an alkylene oxide with mixed alkylene polyamines, and by reaction of alkylene polyamine mixtures with mixed oxides.

In general, these hardeners and resin-hardener compositions can be used in the same applications and in the same manner as those previously known. For example, they may be used to cast tools, dies, jigs, and fixtures, for encapsulating and potting, for laminating, bonding, etc. Fillers of virtually any sort may be employed, such as glass, mineral materials, cellulose, metal powders, synthetic resin (cured) and the like. The curing reaction may be accelerated with moderated heat input such as provided by infra-red lamps, particularly in laminating or enfilleting applications and the like in which fillers are present. Post curing cycles may be used (i.e., at elevated temperatures) to improve heat-distortion, hardness and chemical resistance, or the entire cure may be conducted at elevated temperatures in bonding applications and the like in which the resin layer is relatively thin and the exothermic heat of reaction can therefore escape rapidly.

We claim:

1. Hardenable composition comprising a polyglycidyl ether of a polyhydric phenol having an epoxy equivalency of more than one and a hydroxyalkyl alkylene polyamine having at least one hydroxyalkyl group and at least three amino hydrogen atoms per molecule in an amount reactive with said polyglycidyl ether to form a hard, infusible, and insoluble product.

2. Hardenable composition comprising a mixture of a polyglycidyl ether of a dihydric bisphenol having an epoxy equivalency of more than one and a hydroxyalkyl alkylene polyamine having the formula

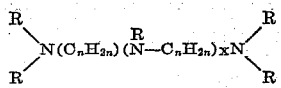

wherein X is an integer from zero to 3, $n$ is an integer from 2 to 6 and each R is a monovalent substituent selected from the group consisting of hydrogen and hydroxyalkyl, the number of instances where R is a hydroxyalkyl group being at least one but less than $X+2$ molecule said polyamine being present in an amount reactive with said polyglycidyl ether to form a hard, infusible, and insoluble product.

3. Hardenable epoxide composition according to claim 2 wherein the hardener comprises a mixture of hydroxyalkyl alkylene polyamines having an average composition corresponding to the formula set forth in claim 2.

4. Hardenable composition according to claim 2 wherein the hardener comprises a mixture of hydroxyalkyl alkylene polyamines having an average composition corresponding to the formula set forth in claim 2 and containing up to 10% by weight of aliphatic alkylene polyamines.

5. Hardenable composition comprising a mixture of a polyglycidyl ether of a polyhydric phenol having an epoxy equivalency of more than one and N-hydroxyethyl ethylene diamine in an amount reactive with said polyglycidyl ether to form a hard, infusible, and insoluble product.

6. Hardenable composition comprising a mixture of a polyglycidyl ether of a polyhydric phenol having an epoxy equivalency of more than one and N-hydroxyethyl diethylene triamine in an amount reactive with said polyglycidyl ether to form a hard, infusible, and insoluble product.

7. Hardenable composition comprising a mixture of a polyglycidyl ether of a polyhydric phenol having an epoxy equivalency of more than one and N-hydroxypropyl diethylene triamine in an amount reactive with said polyglycidyl ether to form a hard, infusible, and insoluble product.

8. Hardenable composition comprising a mixture of a polyglycidyl ether of a polyhydric phenol having an epoxy equivalency of more than one and N-hydroxyethyl propylene diamine in an amount reactive with said polyglycidyl ether to form a hard, infusible, and insoluble product.

9. Hardenable composition comprising a mixture of a polyglycidyl ether of a polyhydric phenol having an epoxy equivalency of more than one and N-hydroxypropyl propylene diamine in an amount reactive with said polyglycidyl ether to form a hard, infusible, and insoluble product.

10. Hardenable composition comprising a polyglycidyl ether of a bisphenol having epoxy equivalency of more than one and a hydroxyalkyl alkylene polyamine having the formula

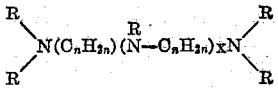

wherein X is an integer from zero to 3, $n$ is an integer from 2 to 6 and each R is a monovalent substituent selected from the group consisting of hydrogen and hydroxyalkyl, the number of instances where R is a hydroxyalkyl group being at least one but less than $X+2$ per molecule, said polyamine being present in an amount reactive with said polyepoxy compound to form a hard, infusible, and insoluble product.

11. Method of initiating room temperature curing of a polyglycidyl ether of a polyhydric phenol having an epoxy equivalency of more than one to form a hard infusible and insoluble product, which comprises mixing the polyglycidyl ether with a hardening amount of a hydroxyalkyl alkylene polyamine having the formula

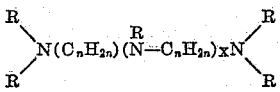

wherein X is an integer from zero to 3, $n$ is an integer from 2 to 6 and each R is a monovalent substituent selected from the group consisting of hydrogen and hydroxyalkyl, the number of instances where R is a hydroxyalkyl group being at least one but less than $X+2$ per molecule.

12. A hardened infusible composition comprising the reaction product of a polyglycidyl ether of a dihydric bisphenol having an epoxy equivalency of more than one and a hydroxyalkyl alkylene polyamine having at least one hydroxyalkyl group and at least three amino hydrogen atoms.

13. A hardened infusible resinous composition comprising the reaction product of a polyglycidyl ether of a bisphenol having an epoxy equivalency of more than one and a hydroxyalkyl alkylene polyamine having at least one hydroxyalkyl group and at least three amino hydrogen atoms.

14. Method of hardening a polyglycidyl ether of a polyhydric phenol having an epoxy equivalency of more than one which comprises mixing the polyglycidyl ether with a hardening amount of hydroxyalkyl alkylene polyamine having more than two amino hydrogen atoms per molecule.

15. Hardened resinous compositions of a polyglycidyl ether of a polyhydric phenol having an epoxy equivalency of more than one and a hydroxyalkyl alkylene polyamine having more than two amino hydrogen atoms per molecule.

References Cited in the file of this patent

UNITED STATES PATENTS 2,723,241   De Groote et al. ............ Nov. 8, 1955
2,742,448   Beacham et al. ............ Apr. 17, 1956

UNITED STATES PATENT OFFICE
CERTIFICATE OF CORRECTION

Patent No. 2,901,461

August 25, 1959

Victor Auerbach et al

It is hereby certified that error appears in the printed specification of the above numbered patent requiring correction and that the said Letters Patent should read as corrected below.

Column 2, line 24, for "equivalent" read -- equivalency --; column 5, line 68, for "dihydroxyethylene" read -- dihydroxyethyl --; column 11, Table II, in the heading to the last column thereof, after "Reach" insert -- Peak --; column 15, line 12, before "molecule" insert -- per --; line 55, for "bisphenol" read -- polyhydric phenol --; column 16, line 11, for "polyepoxy compound" read -- polyglycidyl ether --; line 37, for "bisphenol" read -- polyhydric phenol --.

Signed and sealed this 29th day of March 1960.

(SEAL)
Attest:

KARL H. AXLINE
Attesting Officer

ROBERT C. WATSON
Commissioner of Patents